United States Patent
Jang et al.

(10) Patent No.: US 9,013,413 B2
(45) Date of Patent: Apr. 21, 2015

(54) DRIVING CIRCUIT FOR LIQUID CRYSTAL DISPLAY DEVICE AND METHOD FOR DRIVING THE SAME

(75) Inventors: Su-Hyuk Jang, Daegu (KR); Hwan-Joo Lee, Daegu (KR)

(73) Assignee: LG Display Co., Ltd., Seoul (KR)

( * ) Notice: Subject to any disclaimer, the term of this patent is extended or adjusted under 35 U.S.C. 154(b) by 212 days.

(21) Appl. No.: 12/647,306

(22) Filed: Dec. 24, 2009

(65) Prior Publication Data

US 2011/0007003 A1  Jan. 13, 2011

(30) Foreign Application Priority Data

Jul. 10, 2009  (KR) .................... 10-2009-0063198

(51) Int. Cl.
*G06F 3/041* (2006.01)
*G09G 3/36* (2006.01)

(52) U.S. Cl.
CPC ............ *G06F 3/0412* (2013.01); *G09G 3/3655* (2013.01); *G09G 3/3659* (2013.01)

(58) Field of Classification Search
USPC ........................................................ 345/173
See application file for complete search history.

(56) References Cited

U.S. PATENT DOCUMENTS

| 2005/0077452 A1* | 4/2005 | Morrison et al. ............. 250/221 |
| 2006/0087504 A1* | 4/2006 | Meier et al. .................... 345/418 |
| 2007/0091078 A1* | 4/2007 | Park et al. ...................... 345/173 |

* cited by examiner

*Primary Examiner* — Jonathan Boyd
(74) *Attorney, Agent, or Firm* — Birch, Stewart, Kolasch & Birch, LLP

(57) ABSTRACT

A driving circuit of a liquid crystal display device and a driving method of the same are discussed. A driving circuit of a liquid crystal display device includes a liquid crystal panel comprising pixel cells having only circuit pixels, respectively, aligned in a matrix type corresponding to full resolution, the liquid crystal panel disposed in a matrix type to have resolution that is lower than the full resolution in a predetermined ratio; a panel driving unit driving entire pixel cells provided in the liquid crystal panel to display images, the panel driving unit converting and outputting touch sensing signals transmitted from the pixel cells having the touch sensor circuits into digital signals; and a sensing system calculating touch coordinates from the converted touch sensing signals.

10 Claims, 7 Drawing Sheets

DRIVING CIRCUIT FOR LIQUID CRYSTAL DISPLAY DEVICE AND METHOD FOR DRIVING THE SAME

CROSS REFERENCE TO RELATED APPLICATION

This application claims the benefit of Korean Patent Application No. 10-2009-0063198, filed on Jul. 10, 2009, which is hereby incorporated by reference as if fully set forth herein.

BACKGROUND OF THE DISCLOSURE

1. Field of the Disclosure

The present invention relates to a touch sensor in panel type liquid crystal display device (LCD), more particularly, to a driving circuit of a liquid crystal display device that is able to smoothly and gently connect coordinates not sensed by touch sensors smoothly by using a simple configuration and method.

2. Discussion of the Related Art

Liquid crystal display devices controls light transmissivity of a liquid crystal layer via an electric field applied to the liquid crystal layer according to a video signal to display images. Such a liquid crystal display device is a flat panel display device having an advantage of small thin type with low electricity consumption, which has been applied to various fields such as a portable computer, office automation apparatus, audio/video apparatus and the like. Especially, an active matrix type LCD device is advantageous in representing a moving picture because a switching device formed in every liquid crystal cell is actively controllable.

A thin file transistor (TFT) is commonly used as switching device for the active matrix type LCD device.

Recently, technology that a touch screen panel is attached to such the LCD device has been proposed. If a finger or touch pen is touched on a screen by a user, the LCD device having the touch screen panel attached thereto detects information on the touch position and embodies various applications based on the detected information. However, such the LCD device has disadvantages of cost increase because of the touch screen panel, yield decrease caused by the addition of the process attaching the touch screen panel to the liquid crystal display panel and brightness deterioration and thickness increase of the liquid crystal panel.

To solve the above problems, a touch-sensor-in-panel type LCD device has been proposed in various ways instead of the touch screen panel. The touch sensor in panel type LCD includes a touch sensor circuit including a sensor TFT formed in a pixel cell of the liquid crystal panel. Each of the pixel cells of such the touch sensor in panel type further includes a touch sensor circuit rather than a pixel circuit displaying an image. The touch sensor circuit senses a light from the outside and it supplies a light sensing signal corresponding to the light to a readout integrated circuit (IC).

However, the above touch sensor circuits have influence on an aperture ratio or formation section of each pixel cell and on full resolution of a liquid crystal panel as well. As a result, resolution of touch sensor circuits is formed lower than the full resolution of the liquid crystal panel. Then, coordinates extracted by the touch sensor circuits are not connected smoothly only to deteriorate user satisfaction. Because of that, the coordinates not sensed should be compensated by embodying a hardware configuration to be complex, for example, increase of sensing frequencies or usage of plurality of frame memories.

SUMMARY OF THE DISCLOSURE

Accordingly, the present invention is directed to a driving circuit of a liquid crystal display device and a method of driving the same.

An object of the present invention is to provide a driving circuit of a liquid crystal display device that is able to smoothly and gently connect coordinates not sensed by touch sensors smoothly by using a simple configuration and method.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a driving circuit of a liquid crystal display device includes a liquid crystal panel comprising pixel cells having only circuit pixels, respectively, aligned in a matrix type corresponding to full resolution, the liquid crystal panel disposed in a matrix type to have resolution that is lower than the full resolution in a predetermined ratio; a panel driving unit driving entire pixel cells provided in the liquid crystal panel to display images, the panel driving unit converting and outputting touch sensing signals transmitted from the pixel cells having the touch sensor circuits into digital signals; a sensing system calculating touch coordinates from the converted touch sensing signals, and the sensing system performing a triangle midpoint extracting algorithm according to the touch coordinates and a connection direction of the touch coordinates at least one time to generate at least one compensation coordinate and generating and outputting notation data having the touch coordinates and the compensation coordinates connected thereto; and a timing controller controlling the panel driving unit to display the notation data in the liquid crystal panel together with image data input from the outside.

The panel driving unit may include a data driver driving data lines of the liquid crystal panel; a gate driver driving gate lines of the liquid crystal panel; a scan driver driving scan lines connected to the pixel cells having the touch sensor circuits; and a readout integrated circuit receiving touch sensing signals from the touch sensor circuits via readout lines connected to the pixel cells having the touch sensor circuits.

The sensing system may calculate coordinate values of pixel cells having the touch sensing signals detected therein by receiving the touch sensing signals via the readout integrated circuit, and the sensing system may extendedly convert the calculated coordinate values of the pixel cells to correspond a ratio of an alignment resolution of the touch sensor circuits to a full resolution of the liquid crystal panel, and the sensing system may compare and analyze at least three coordinate values connected adjacently of the calculated coordinate values of the pixel cells to extract coordinate values of regions having curves formed therein, and the sensing system may invert a former coordinate value with respect to a reference coordinate value of the at least three coordinate values connected to each other, and the sensing system may perform a first-triangle-midpoint extracting algorithm with respect to the extracted inversion coordinate value, the reference coordinate value and a next coordinate value connected to the reference coordinate value to extract a coordinate value of a first-triangle-midpoint, and the sensing system may apply the extracted first-triangle-midpoint as compensation coordinate.

The sensing system may further perform a second-triangle-midpoint extracting algorithm by using a coordinate value of the extracted first-triangle-midpoint, the reference coordinate value and the next coordinate value to extract first and second coordinate values of the second-triangle-midpoint, and the sensing system may apply the first and second coordinate values of the second-triangle-midpoint as compensation coordinate.

The sensing system may extract the reference coordinate value and a midpoint coordinate value of the next coordinate value, and the sensing system may perform a second-triangle-midpoint extracting algorithm with respect to the reference coordinate value, the first-triangle-midpoint coordinate value and the extracted midpoint coordinate value to extract first and second coordinate values of the second-triangle-midpoint, and the sensing system may re-perform the triangle midpoint extracting algorithm with respect to the extracted midpoint coordinate value, the first-triangle-midpoint coordinate value and the next coordinate value to extract a second coordinate value of the second-triangle-midpoint.

In another aspect of the present invention, a method of driving a liquid crystal display device comprising a liquid crystal panel comprising pixel cells having only circuit pixels, respectively, aligned in a matrix type corresponding to full resolution, the liquid crystal panel disposed in a matrix type to have resolution that is lower than the full resolution in a predetermined ratio, the method includes steps of: displaying images by driving entire pixel cells provided in the liquid crystal panel and converting and outputting touch sensing signals transmitted from the pixel cells having the touch sensor circuits into digital signals; generating at least one compensation coordinate by calculating touch coordinates of the converted touch sensing signals and by performing a triangle midpoint algorithm according to the touch coordinates and a connection direction of the touch coordinates at least one time, and generating and outputting notation data having the touch coordinates and the at least one compensation coordinate connected thereto; and driving the liquid crystal panel to display the notation data in the liquid crystal panel together with image data input from outside.

The driving step of the liquid crystal panel may include steps of: driving data lines of the liquid crystal panel; driving gate lines of the liquid crystal panel; driving scan lines connected to the pixel cells having the touch sensor circuits; and converting and outputting touch sensing signals transmitted from the touch sensor circuits via readout lines connected to the pixel cells having the touch sensor circuits into digital signals.

The generating step of the at least one compensation coordinate may include steps of: calculating coordinate values of pixel cells having the transmitted touch sensing signals detected therein; extendedly converting the calculated coordinate values of the pixel cells to correspond a ratio of alignment resolution of the touch sensor circuits to full resolution of the liquid crystal panel; extracting coordinate values of regions having a curve formed therein by comparing and analyzing at least three coordinate values connected adjacently of the extracted coordinate values of the pixel cells; extracting an inversion coordinate value of a former coordinate value by inverting a former coordinate value with respect to a reference coordinate value of the at least three coordinate values connected to each other; extracting a coordinate value of a first-triangle-midpoint by performing a first-triangle midpoint extracting algorithm with respect to the extracted inversion coordinate value, the reference coordinate value and the next coordinate value connected next to the reference coordinate value; and applying the extracted first-triangle-midpoint as compensation coordinate.

The generating step of the at least one compensation coordinate may further include a step of: extracting first and second coordinate values of a second-triangle midpoint by performing a second-triangle-midpoint extracting algorithm with respect to the extracted first-triangle-midpoint coordinate value, the reference coordinate value and the next coordinate value and applying the extracted first and second second-triangle-midpoints as compensation coordinates.

The extracting step of the first and second coordinates of the second-triangle-midpoint may include steps of: extracting the reference coordinate value and a midpoint coordinate value of the next coordinate value; extracting the first coordinate value of the second-triangle-midpoint by performing the second-triangle-midpoint extracting algorithm with respect to the reference coordinate value, the first-triangle-midpoint coordinate value and the extracted midpoint coordinate value; and extracting the second coordinate value of the second-triangle-midpoint by re-performing the triangle midpoint extracting algorithm with respect to the extracted midpoint coordinate value, the first coordinate value of the first-triangle midpoint and the next coordinate value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

As follows, a driving circuit for a liquid crystal display device and a method for driving the same according to an exemplary embodiment of the present invention will be described in reference to the accompanying drawings in detail.

Figure 1:
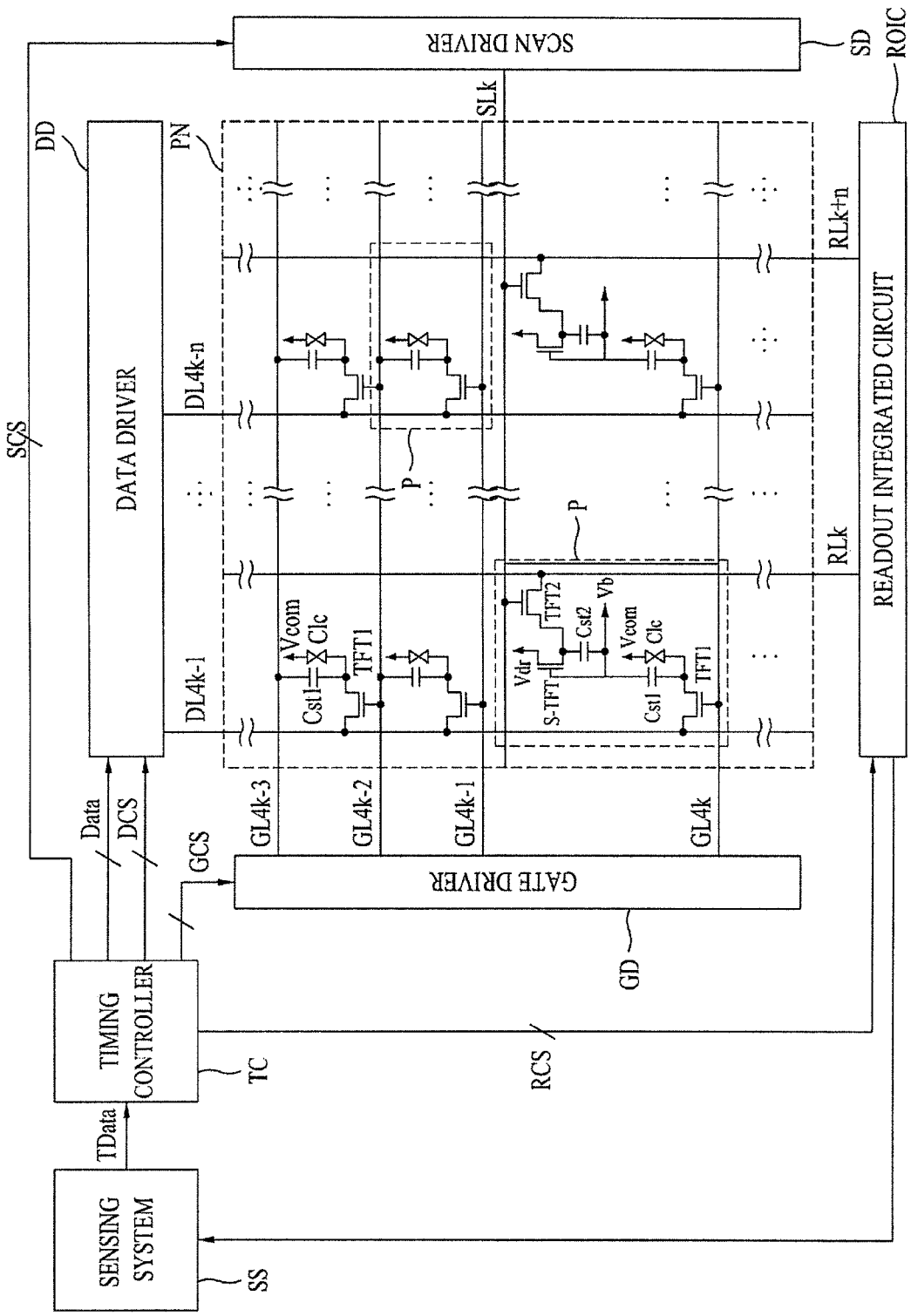
FIG. 1 is a diagram illustrating a liquid crystal display device according to an exemplary embodiment of the present invention.

FIG. 1 is a diagram illustrating a LCD device according to an exemplary embodiment of the present invention.

The LCD device shown in FIG. 1 includes a liquid crystal panel (PN), a panel driving unit, a sensing system (SS) and a timing controller (TC). According to the liquid crystal panel, pixel cells (P) only having pixel circuits are arranged corresponding to full resolution are arranged in regions defined by cross of plural data lines (GL4k-3 to GL4) and data lines (DL4k to DL4k-n) and the pixels (P) further including touch sensor circuits are arranged in the pixel circuits in a matrix type to have predetermined resolution that is lower than the full resolution. The panel driving unit drives all of the pixel cells (P) and receives a touch sensing signal from the pixel cells (P) to convert the touch sensing signal into a digital signal and to output the digital signal. The sensing system (SS) receives the touch sensing signal converted into the digital signal and extracts touch coordinates. Then, the sensing system (SS) generates at least one compensation coordinate by performing a triangle center extracting algorithm at least one time according to the extracted touch coordinates and the connection direction and it senses notation data (TData) of the connection between the touch coordinates and the compensation coordinates. The timing controller (TC) controls the panel driving unit for the notation data (TData) to be displayed in the liquid crystal panel (PN) together with image data input from the outside.

The liquid crystal panel (PN) includes an upper substrate having a color filter formed thereon, a lower substrate having pixel cells formed thereon and a liquid crystal layer disposed between the upper and lower substrates. The pixel cells (P) includes a pixel circuit and a touch sensor circuit. The liquid crystal panel having the above configuration will be described later in reference to the corresponding accompanying drawings.

The panel driving unit driving the whole pixel cells (P) provided on the liquid panel includes a data driver (DD) driving data lines (DLK4k-3 to DLK4k-n, 'n' is a natural number) of the liquid panel (PN), a gate driver (GD) driving gate lines (GL4k-3 to GLK4k-n, 'k' is a natural number except zero '0', a scan driver (SD) driving can lines (SLk) connected to the pixel cell including the touch sensor circuit, a readout integrated circuit (ROIC) receiving an analog touch sensing signal from the touch sensor circuit via the readout lines (RLk to RLk+n) connected to the pixel cells (P) including the touch sensor circuit.

The data driver (DD) converts digital image data input via the timing controller (TC) into an analog gamma compensation voltage, in response to a data control signal (DCS) of the timing controller (TC), and it supplies the analog gamma compensation voltage to each of the data lines (DL4k-3 to DL4k-n) of the liquid crystal panel (PN) as data signal.

The gate driver (GD) generates a gate signal sequentially, in response to a gate control signal (GCS) of the timing controller (TC), and it supplies the gate signal to the gate lines (GL4k-3 to GL4k) sequentially to select horizontal lines of the liquid crystal panel (PN) sequentially. Here, data signals are supplied to the horizontal lines.

The scan driver (SD) generates a scan signal, in response to a scan control signal (SCS) of the timing controller (TC), and it supplies the scan signal to the scan lines (SLn) sequentially to select horizontal lines receiving a photoelectric current.

The readout IC (ROIC) includes a plurality of integrated circuits connected to the readout lines (RLk to RLk+n) of the liquid crystal panel (PN), respectively, and it converts the touch sensing signal of the readout lines (RLk to RLk+n) into digital signals to supply the digital signals to the sensing system (SS).

The timing controller (TC) aligns the image data input from an external system (not shown) and notation data (Tdata) input from the sensing system (SS), corresponding to the liquid crystal panel (PN), to supply to the data driver (DD). The timing controller (TC) generates and supplies the data control signal (DCS) for controlling the data driver (DD), the gate control signal (GCS) for controlling the gate driver (GD), the scan control signal (SCS) for controlling the scan driver (SD) and the readout control signal (ROCS) for controlling the readout IC (ROIC), by using synchronizing signals (not shown) from the external system.

The sensing system (SS) receives the touch sensing signal from the readout IC (ROIC) and it performs a coordinate calculation process to calculate coordinates. The sensing system (SS) performs a triangle midpoint extraction algorithm at least one time according to the calculated touch coordinates and the connection direction of the coordinates, only to generate at least one compensation coordinate. In addition, the sensing system (SS) generates the notation data (Tdata) by combining the compensation coordinates with the touch coordinates. Here, the notation data (Tdata) has the touch and compensation coordinates connected thereto. A method of generating the notation data (Tdata) by using the sensing system (SS) will be described later in detail.

In the meanwhile, as mentioned above, the pixel circuit is formed in each of the pixel cell (P) formed in the liquid crystal panel (PN) in a matrix type corresponding to the full resolution. The pixel circuit displays the data signals of the data lines (DL4k-3 to DL4k-n) in response to the gate signals of the gate lines (GL4k-3 to GL4k). The touch sensor circuits are formed in the pixel cells (P) set in a matrix type to have a lower resolution than the full resolution.

Specifically, if the liquid crystal panel (PN) is set to have the resolution of 1280*800 (WXGA 16:10), touch sensor circuits are formed a single pixel cell per 4*4 pixel cells (P) in the ratio 4:1 to have a 320*200 resolution. That is, the touch sensor circuits are matrix-typed in the corresponding pixel cells (P) in the ratio of least 2:1 with respect to the full resolution of the liquid crystal panel (P), that is, one of the ratios of 3:1, 6:1, 8:1, 12:1 and 16:1. As shown in FIG. 1, in case the touch sensor circuits are formed in a single pixel cell per 4*4 pixel cells (P), that is, in case of the ratio of 4:1, the touch sensor circuits are provided in the pixel cells connected to the 4k-3th data line or the 4k-nth data one (DL4k-n) out of the pixel cells (P) connected to the 4kth gate line (GLk).

The touch sensors sense a light from outside and they store a touch sensing signal corresponding to the sensed light. Then, the touch sensor transmits the stored touch sensing signal to the readout IC (ROIC) via the readout lines (RLk to RLk+n) according to the scan signal of the scan lines (SLk) that is, the pixel circuit and the touch sensor circuit provided in the single pixel cell (P) together are driven independently according to signals of the different lines. In other words, the pixel circuit is driven according to the gate signal of the gate lines (GL4k-3 to GL4k) and the touch sensor circuit is driven according to the scan signal of the scan lines (SLk). As a result, the operation of displaying image via the pixel circuit and the operation of reading the touch sensing signal via the touch sensor circuit may be performed simultaneously. The touch sensor circuit used in the present invention may be a touch sensor having a photo sensor or cap type sensor.

Figure 2:
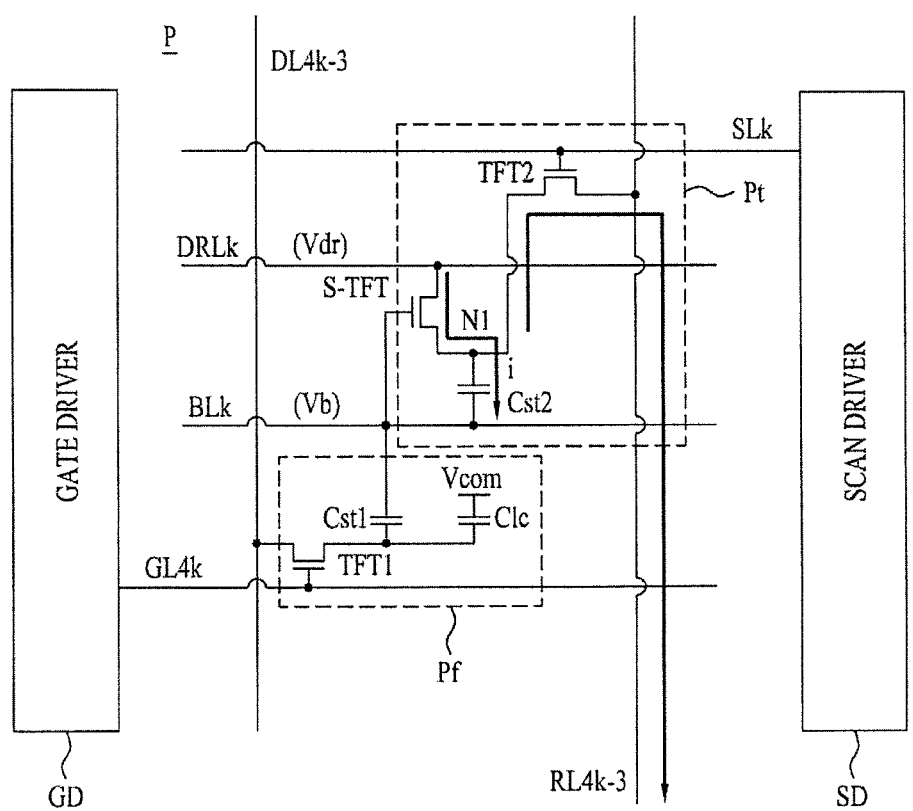
FIG. 2 is an equivalent circuit diagram of a pixel cell (P) having a touch sensor circuit shown in FIG. 1.

FIG. 2 is an equivalent circuit diagram of the pixel cell (P) having the touch sensor circuit provided therein.

In reference to FIG. 2, the pixel cell (P) having the touch sensor circuit (Pt) includes a pixel circuit (pf) formed at an intersection of the 4kth gate line (GL4k) and the 4k-3th data line (DL4k-3), a touch sensor circuit (Pt) formed at an intersection of the kth bias lines (BLk) and the kth driving line (DRLk) and the 4k-3th readout line (RL4k-3). As a result, the k-3th readout line (RL4k-3) is formed in a vertical line corresponding to the 4k-3th data line (DL4k-3) and the kth scan line (SLk) is formed in a horizontal line corresponding to the 4kth gate line (GL4k).

The pixel circuit (Pf) is formed in an intersection of the liquid crystal cell, the gate line (GL4k) and the data line (DL4k-3) and it includes a pixel TFT (TFT1) for driving the liquid crystal cell (Clc) and a storage capacitor (Cst1) for maintaining a charge voltage of the liquid crystal cell for a single frame period.

The pixel TFT (TFT1) supplies the data signal transmitted via the data lines (DL4k-3) to the pixel electrode of the liquid crystal cell (Clc) according to the gate signal of the gate lines (GL4k). For that, the gate electrode of the pixel TFT (TFT1) is connected to the gate line (GL4k) and the source electrode is connected to the data line (DLK4k-3) and the drain electrode is connected to the pixel electrode of the liquid crystal cell (Clc). The liquid crystal cell (Clc) is charged by a pixel voltage that is electric potential of a data voltage and common voltage (Vcom) and the alignment of liquid crystal molecules is changed by an electric field formed in this electric potential such that the quantity of the transmitted light is adjusted or the light is shut off. The storage capacitor (Cst1) is connected between a drain electrode of the pixel TFT (TFT1) and the driving line (DRLk).

The touch sensor circuit (Pt) includes a sensor TFT (S-TFT) generating an photoelectric current (i) differently according to, not generating the photoelectric current (i) during the period in which the driving voltage (Vdr) is maintained in a low electric potential, a sensor capacitor (Cst2) storing electric charge of the photoelectric current (i), and switch TFT (TFT2) switching the electric charges stored in the sensor capacitor (Cst2) to the readout line (RL4k-3).

A gate electrode of the sensor TFT (S-TFT) is connected to the bias line (BLK) and a source electrode thereof is connected to a first node (N1). A bias voltage (Vb) set under a threshold voltage is supplied to the gate electrode of the sensor TFT (S-TFT) and a uni-voltage is supplied to the sensor TFT (S-TFT). The sensor TFT (S-TFT) performs optical sensing corresponding to the user's finger touch. Such the sensor TFT (S-TFT) generates the photoelectric current (i) in response to the light incident from the outside and the photoelectric currents have different sizes based on whether to correspond to a touch position, because it is not covered by a black matrix of the upper substrate, unlike the pixel TFT (TFT1) and the switch TFT (TFT2). That is, the sensor TFT (S-TFT) generates a large photoelectric current (i) corresponding to the touch position in darker illuminance circumstances than the backlight unit, for example, outdoor circumstances, in comparison to a photoelectric current (i) not corresponding to the touch position. In contrast, the sensor TFT (S-TFT) generates a smaller photoelectric current corresponding to the touch position (i) in brighter illuminance circumstances, for example, indoor circumstances, in comparison to a photoelectric current corresponding to the touch position.

Electric charges are stored in the sensor capacitor (Cst2) connected between the first node (N1) and the bias line (BLK). A voltage of the first node (N1) is gradually increased by the electric charged stored in the sensor capacitor (Cst2) until the switch TFT (TFT2) is turned on. The voltage of the first node (N1) has different sizes based on whether to correspond to the touch position. That is, the voltage of the first node (N1) corresponding to the touch position is larger in illuminance circumstances (indoor circumstances) darker than the back-light, in comparison to the voltage not corresponding to the touch position. Constantly, the voltage of the first node (N1) corresponding to the touch position is smaller in illuminance circumstances (outdoor circumstances) brighter than the back-light, in comparison to the voltage not corresponding to the touch position.

A gate electrode of the switch TFT (TFT2) is connected to the kth scan line (SLk) and a drain electrode thereof is connected to the kth readout line (RLk). The switch TFT (TFT2) is turned on in response to the scan signal supplied to the kth scan line (SLk) and it outputs the voltage of the first node (N1) to the kth readout line (RLk) as touch sensing signal. According to the present invention, while the pixel TFT of the pixel circuit (Pf) is driven by using the gate signal of the gate line (GLk), the sensor TFT of the touch sensor circuit (Pt) is driven by using the scan signal of the scan line (SLi). As a result, the pixel TFT (TFT1) and the sensor TFT (S-TFT) may be driven simultaneously.

Figure 3:
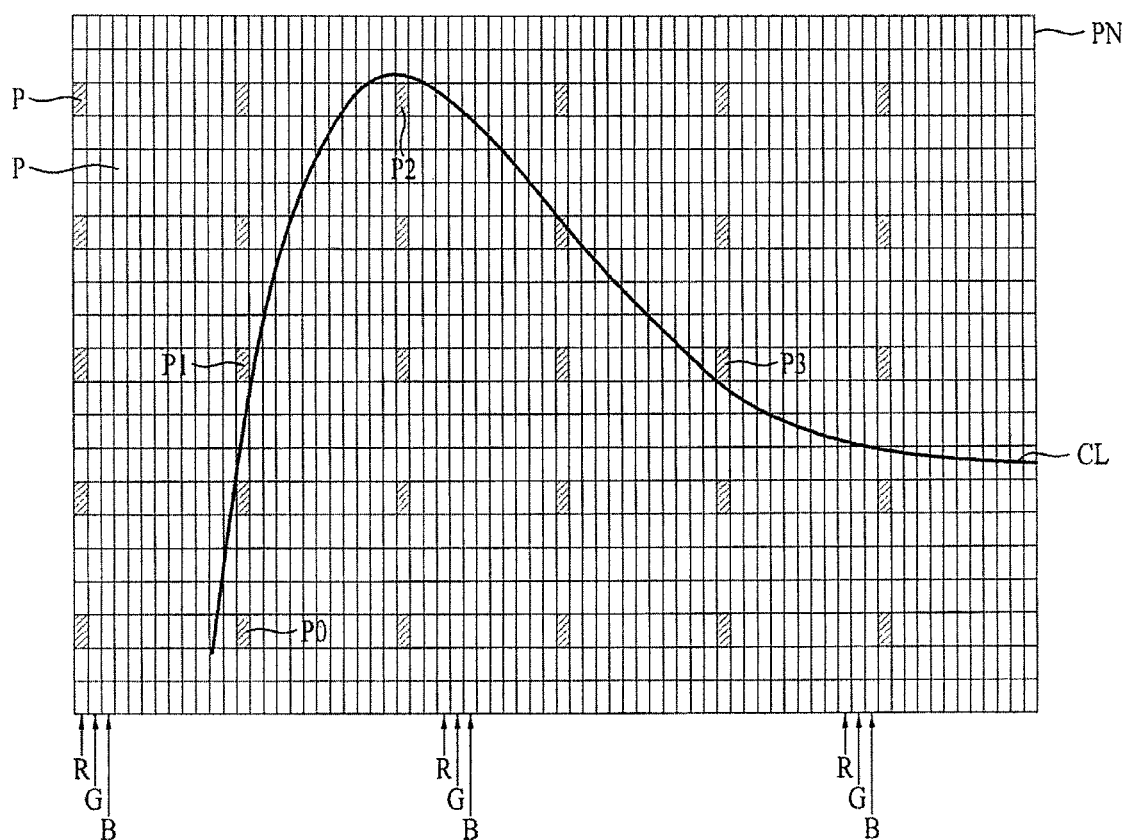
FIG. 3 is a diagram illustrating a touch coordinate detecting method of a curve line formed by a user.

FIG. 3 is a diagram illustrating a method of detecting touch coordinates of a curve line formed by the user.

As shown in FIG. 3, the touch sensor circuit (Pt) is formed in the pixel cells (pixel cells provided in a slash region) corresponding to the lower resolution ratio than the full resolution out of the pixel cells (P) aligned in the liquid crystal panel (PN) in the matrix type. FIG. 3 presents the liquid crystal panel (PN) having red (R), green (G) and blue (B) pixel cells sequentially aligned to form a single unit pixel. This case presents an example in that the touch sensor circuit (Pt) is formed in the red (R) pixel cell of each unit pixel set to have the lower resolution ratio of 4:1 with respect to the full resolution.

In case the user forms a curve line (CL) in the liquid crystal panel (PN) formed as mentioned above, that is, the user draws curve such as the curve line (CL) shown in FIG. 3, the touch sensor circuit (Pt) overlapped with the curve line (CL) or positioned adjacent to the curve line (CL) supplies the touch sensing signal to the readout IC (ROIC). For example, according to the liquid crystal panel (PN) shown in FIG. 3, the touch sensor circuit positioned in P0 coordinate, P1 coordinate, P2 coordinate and P3 coordinate (P0, P1, P2 and P3) supplies the touch signal to the readout IC (ROIC). Then, the readout IC (ROIC) converts the touch sensor circuit (Pt) into the digital signal and it transmits the digital signal to the sensing system (SS).

Figure 4A:
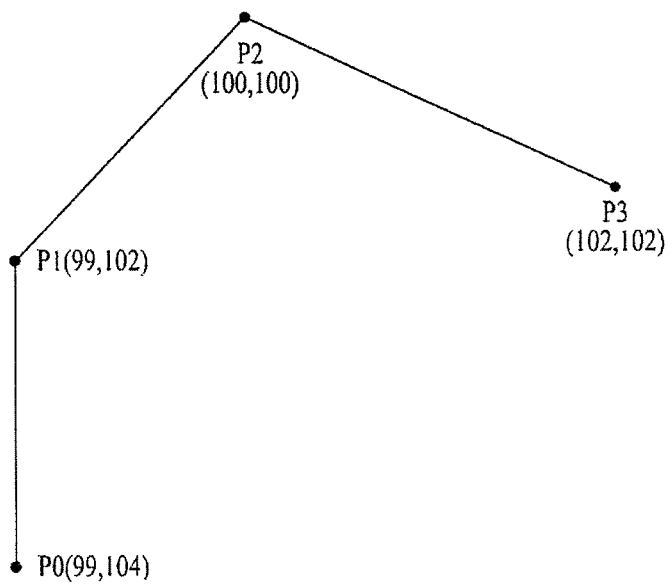
FIGS. 4a and 4b are diagrams illustrating a touch coordinate extracting process of a sensing system.
Figure 4B:
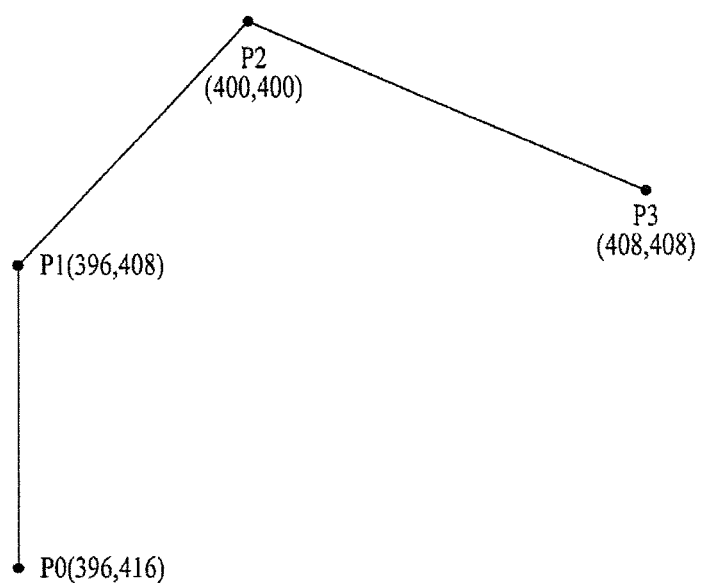

FIGS. 4a and 4b are diagrams illustrating the touch coordinate calculation process of the sensing system.

As shown in FIG. 4a, the sensing system (SS) receives the touch sensing signal converted into the digital signal from the readout IC (ROIC) and it calculates coordinate values of the pixel cells (P) having the touch sensing signal detected, that is, coordinate values of the pixel cells (P) touched by the user. For example, in case the touch sensing signal is detected as shown in FIG. 3, coordinate values of the pixel cells corresponding to P0 coordinate, P1 coordinate, P2 coordinate and P3 coordinate (P0, P1, P2 and P3) as shown in FIG. 4b.

The pixel cells having the touch sensor circuits (pt) provided therein have a resolution set in a lower ratio with respect to the full resolution. Because of that, the calculated coordinate values of the pixel cells (P) having the touch sensor circuit (Pt) provided therein is smaller in a predetermined ratio than those of the full resolution.

As shown in FIG. 4b, the sensing system (SS) extendedly converts the coordinate values of the pixel cells calculated to corresponding to the ratio of the full resolution of the liquid crystal panel (PN) to the alignment resolution of the touch sensor circuits (Pt). For example, in case of extendedly converting the values four times as much as the ratio of the full resolution, the P0, P1, P2 and P3 coordinates (P0, P1, P2 and P3) are extendedly converted in the ratio of 4 to 1 as shown in FIG. 4b. That is, as shown in FIG. 4b, 99.104 that is the coordinate value of P0 coordinate (P0) is extendedly converted into 396, 416 P0 four times as much. P1 99.102 that is the coordinate value of P1 coordinate is converted into P1 396,408. P2 100, 100 is converted into P2 400, 400. P3 102, 102 is converted into P3 408, 408.

Figure 5A:
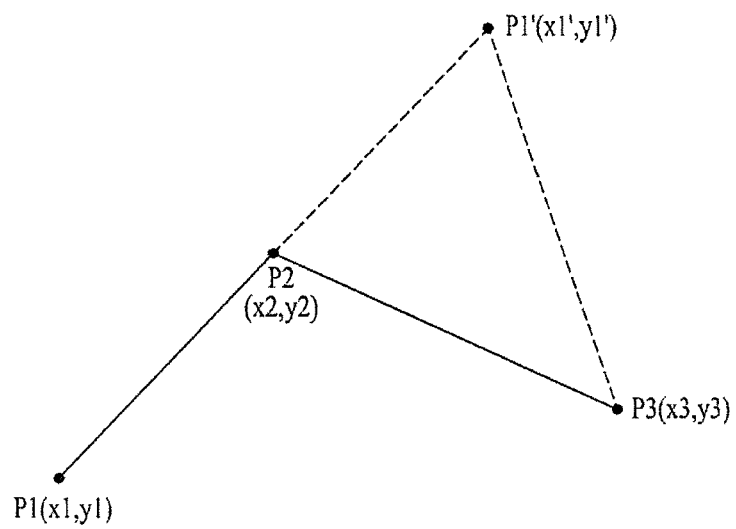
FIGS. 5a and 5b are diagrams illustrating a compensation coordinate generation process of the sensing system.
Figure 5B:
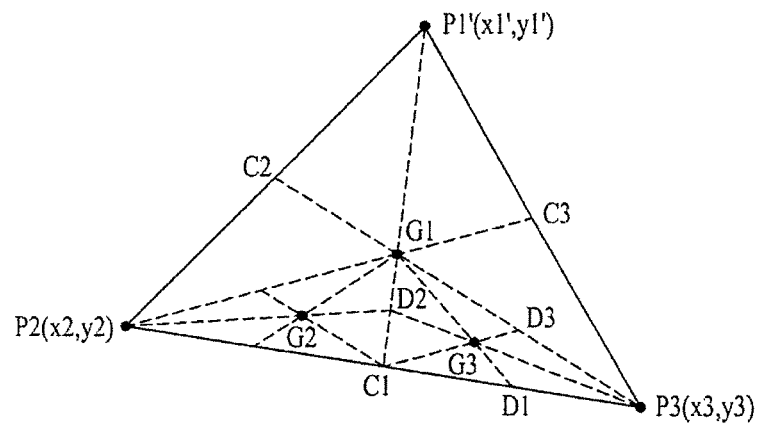

FIGS. 5a and 5b are diagrams illustrating the process of compensation coordinate generation of the sensing system.

As shown in FIG. 5a, the sensing system (SS) compares at least three coordinate values connected to each other adjacently and it calculates coordinate values of regions having the curve lines (CL) formed therein. As mentioned above, the curve lines (CL) are formed by the user. Specifically, the sensing system (SS) compares a reference value of the at least three coordinate values with former and next coordinate values and it detects the direction of the next coordinate based on the result of the comparison to detect the region having the curve line formed therein. This is because it is unnecessary to calculate compensation coordinates in case the direction according to the next coordinate value is identical or similar to the direction of the former value. However, in case at least one compensation coordinate is generated and connected in a region where the direction is changed in a curve shape, for example, the direction from P1 coordinate toward P2 coordinate is changed like the direction of P3 coordinate shown in FIG. 5a, such that a more gentle curve may be formed.

For that, as shown in FIG. 5a, the sensing system (SS) inverts a former value (P1) with respect to a reference coordinate value, for example, P2 out of the at least three coordinate values (P1, P2 and P3) to form a inversion coordinate value (P1') of the former coordinate value (P1). Here, 'x1' and 'y1' may be the inversion coordinate value (P1') of the former coordinate value (P1) and x1 and y1 will be explained in a following equation:

$$x1'=x2+(x2-x1), y1'=y2+(y2-y1) \quad \text{[EQUATION 1]}$$

Next, once the inversion coordinate value (p1') of the former coordinate value (p1) is calculated in the above equation, the sensing system (SS) performs a triangle midpoint extracting algorithm at least one time and it extracts coordinate values of triangle midpoints (G1, G2 and G3).

That is, the triangle midpoint extracting algorithm extracts a coordinate value of a primary midpoint (G1) from coordinate values of a triangle formed by the reference coordinate value (P2), the inversion coordinate value (P1') of the former coordinate value (P1) and the next coordinate value (P3).

At this time, x and y coordinates of the primary midpoint (G1), that is, G1 (x and y) coordinate is extracted by a following equation:

$$G1(x) = \frac{(x1' + x2 + x3)}{3}, \quad \text{[EQUATION 2]}$$

$$G1(y) = \frac{(y1' + y2 + y3)}{3}$$

G1 (x and y) coordinate that is the extracted primary midpoint (G1) is set as compensation coordinate connected between the P2 and P3 coordinates.

However, to present the curve shape of the curve line (CL) formed by the user more gently, secondary midpoints G2 (x and y) and G3 (x and y) may be further extracted by using G1 (x and y) coordinate that is the primary midpoint (G1).

To further extract the secondary midpoints (G1 and G2), that is, G2 (x and y) and G3 (x and y), the reference coordinate value (P2) and a midpoint coordinate C1 of the next coordinate value are extracted by using a following equitation:

$$C1(x) = x2 + \frac{(x3 - x2)}{2}, \quad \text{[EQUATION 3]}$$

$$C1(y) = y2 + \frac{(y3 - y2)}{2}$$

Once P2 coordinate value and the C1 (x and y) that is the center coordinate of P3 coordinate value are extracted, a midpoint coordinate value of a triangle formed by the reference coordinate value (P2), the primary midpoint coordinate value (G1) and the midpoint coordinate value (C1) extracted by using the equation 3, that is, a coordinate vale of a secondary midpoint (G2) may be extracted by using a following equation:

$$G2(x) = \frac{(G1(x) + x2 + C1(x))}{3}, \quad \text{[EQUATATION 4]}$$

$$G2(y) = \frac{(G1(y) + y2 + C1(y))}{3}$$

As shown in the equation 4, once the coordinate value G2 (x and y) of the secondary midpoint (G2) is extracted, a midpoint coordinate value of a triangle formed by the midpoint (C1) extracted by using the equation 3, the primary midpoint coordinate value (G1) and the next coordinate value (P3), that is, a coordinate value G3 (x and y) of another secondary midpoint (G3) is extracted by using a following equation:

$$G3(x) = \frac{(G1(x) + C1(x) + x3)}{3}, \quad \text{[EQUATATION 5]}$$

$$G3(y) = \frac{(G1(y) + C1(y) + y3)}{3}$$

The extracted secondary midpoint coordinates G2 (x and y) and G3 (x and y) are set as compensation coordinate connected between P2 and P3 coordinates.

To form the curve shape of the curve line (CL) formed by the user more gently, secondary midpoints G2 (x and y) and G3 (x and y) are further extracted by using G1 (x and y) that is the primary midpoint G1 and a third midpoint is further extracted by using the second midpoints G2 (x and y) and the G3 (x and y) and the third midpoint is set as compensation coordinate. However, the larger the number of the midpoint extraction is, the more linear the compensation coordinates are. As a result, the compensation coordinates could not be used according to the sizes of the liquid crystal panel (PN) and the pixel cells (P). It is preferable that the number of the midpoint extraction is preset to the number of times enough to use the compensation coordinates.

As mentioned above, the sensing system (SS) at least one compensation coordinate generated through the triangle midpoint extraction process performed at least one time is combined with the sensed touch coordinates (P0, P1, P2 and P3) and the notation data (Tdata) having the touch coordinates (P0, P1, P2 and P3) and the compensation coordinates (G1 or G2 and G3) connected thereto is generated.

Figure 6A:
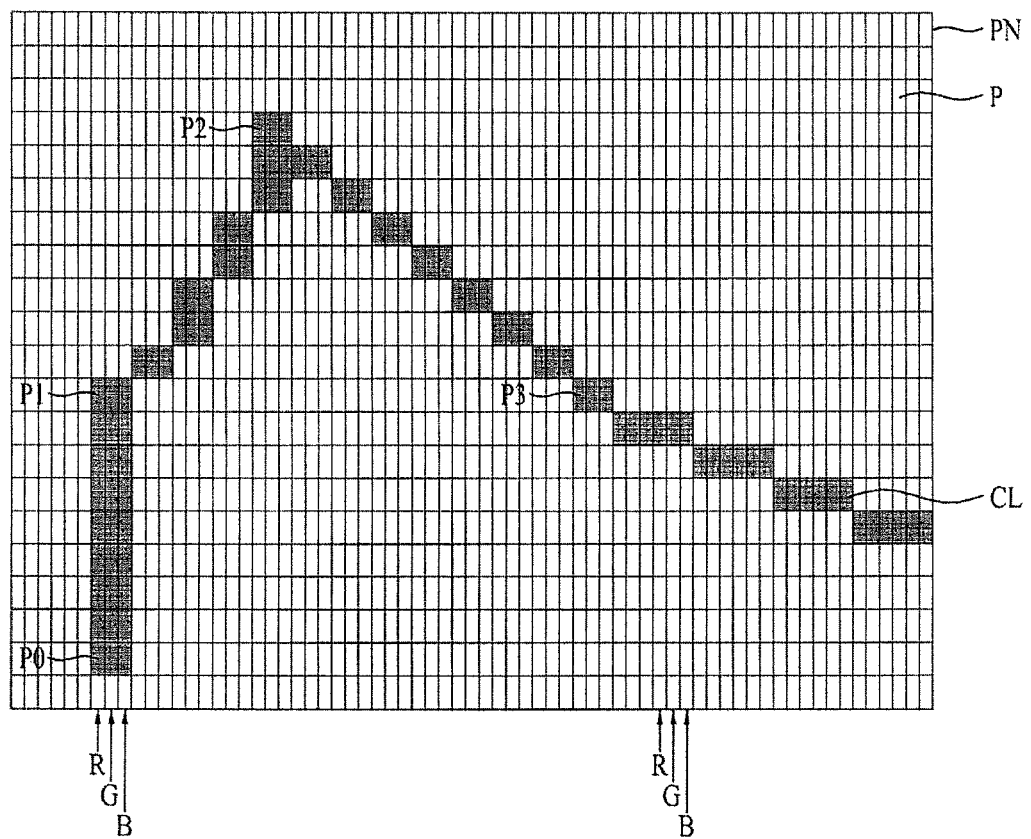
FIGS. 6a and 6b are diagrams illustrating a compensation coordinate application effect according to the present invention.
Figure 6B:
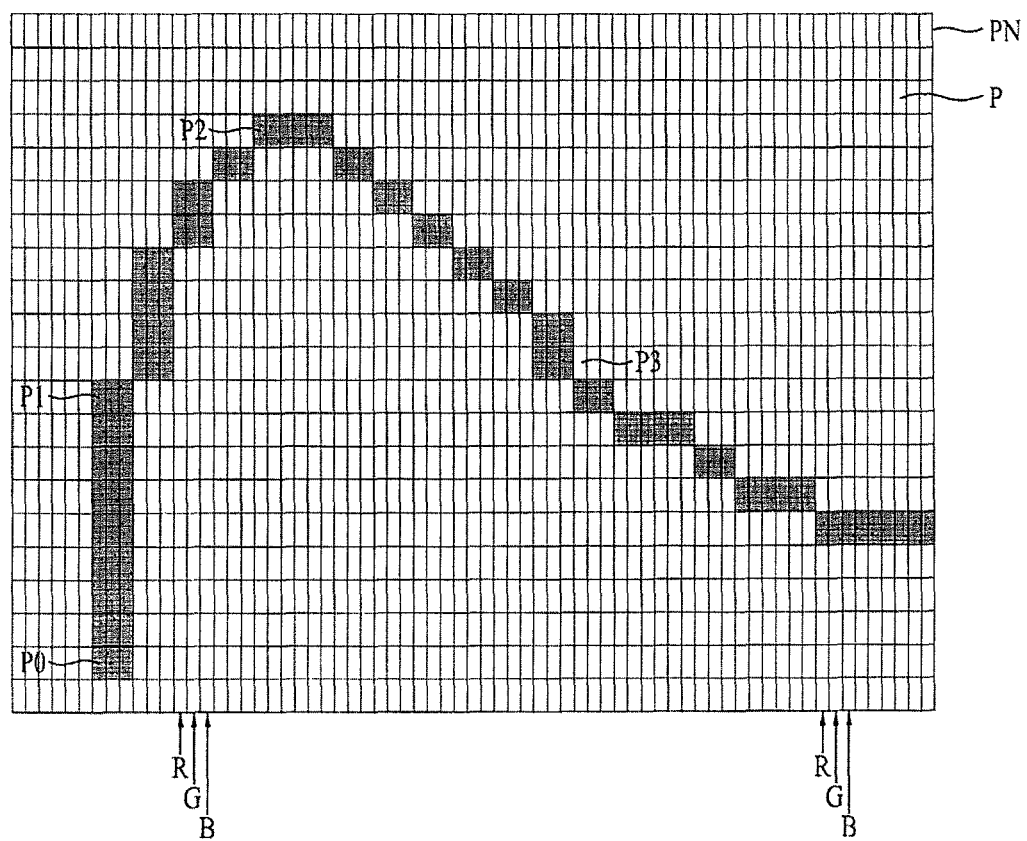

FIGS. 6a and 6b are diagrams illustrating a compensation coordinate application effect according to the present invention.

FIG. 6a present a curve line (CL) formed by the user displayed in the liquid crystal panel (PN) in a state of the compensation coordinates not generated. In this case, the user forms the curve line (CL) and the coordinates (P0, P1, P2 and P3) sensed by the touch sensor circuit (Pt) are displayed, connected to each other. As a result, the curve line (CL) formed by the user is displayed, lines connected and not smoothly.

In contrast, FIG. 6b presents a curve line (CL) displayed in the liquid crystal panel (PN) in a state of the compensation coordinates generated and applied by the sensing system (SS) according to the present invention. After recognizing a connection direction of the coordinates (P0, P1, P2 and P3) sensed by the touch sensor circuits (Pt), the sensing system (SS) according to the present invention performs the triangle midpoint extracting algorithm according to the connection direction at least one time and the compensation coordinates are set and applied. In this case, the coordinates sensed by the touch sensor circuits (Pt) and the compensation coordinates (G1 or G2 and G3) may be connected more smoothly and gently.

As mentioned above, according to the present invention, coordinates not sensed by the touch sensor circuits (Pt) may be connected smoothly and gently, without frequency conversion or complex hardware configuration.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A driving circuit of a liquid crystal display device comprising:
   a liquid crystal panel comprising a plurality of pixel regions defining a plurality of gate lines and a plurality of data lines, the plurality of pixel regions having first pixel cells and second pixel cells, each of the first pixel cells having only a pixel circuit for displaying data signal and each of the second pixel cells having both of the pixel circuit and a touch sensor circuit, wherein the first pixel cells are aligned in a matrix type corresponding to a full resolution, and the second pixel cells are aligned in a matrix type to have a resolution that is lower than the full resolution in a predetermined ratio;
   a panel driving unit driving the first and second pixel cells provided in the liquid crystal panel to display images, the panel driving unit converting and outputting touch sensing signals transmitted from the second pixel cells into digital signals;
   a sensing system calculating touch coordinates from the touch sensing signals detected therein by receiving the touch sensing signals, wherein the touch sensing signals are a sensed line with sharp angles, the sensing system performing a triangle midpoint extracting algorithm according to the touch coordinates and a connection direction of the touch coordinates at least one time to generate at least one compensation coordinate and outputting notation data generated from combining the touch coordinates and the compensation coordinates connected thereto, wherein the at least one compensation coordinate changes the sensed line formed by a user to a gentle curve; and
   a timing controller controlling the panel driving unit to display the notation data in the liquid crystal panel together with image data input from the outside,
   wherein the sensing system calculates coordinate values of the second pixel cells by receiving the touch sensing signals, the sensing system extendedly converting the calculated coordinate values of the second pixel cells to correspond to a ratio of an alignment resolution of the touch sensor circuit to the full resolution of the liquid crystal panel, and the sensing system compares and analyzes at least three coordinate values connected adjacent to the calculated coordinate values of the second pixel cells to extract coordinate values of regions having curves formed therein.

2. The driving circuit of claim 1, wherein the panel driving unit further comprises,
   a data driver driving data lines of the liquid crystal panel;
   a gate driver driving gate lines of the liquid crystal panel; and
   a scan driver driving scan lines connected to the second pixel cells.

3. The driving circuit of claim 2, wherein the sensing system inverts a former coordinate value with respect to a reference coordinate value of the at least three coordinate values connected to each other,
   the sensing system performs a first triangle midpoint extracting algorithm with respect to the extracted inversion coordinate value, the reference coordinate value and a next coordinate value connected to the reference coordinate value to extract a coordinate value of a first-triangle-midpoint, and
   the sensing system applies the extracted first-triangle-midpoint as compensation coordinate.

4. The driving circuit of claim 3, wherein the sensing system further performs a second-triangle-midpoint extracting algorithm by using a coordinate value of the extracted first-triangle-midpoint, the reference coordinate value and the next coordinate value to extract first and second coordinate values of the second-triangle-midpoint, and
   the sensing system applies the first and second coordinate values of the second-triangle-midpoint as compensation coordinate.

5. The driving circuit of claim 4, wherein the sensing system extracts the reference coordinate value and a midpoint coordinate value of the next coordinate value,
   the sensing system performs a second-triangle-midpoint extracting algorithm with respect to the reference coordinate value, the first-triangle-midpoint coordinate value and the extracted midpoint coordinate value to extract first and second coordinate values of the second-triangle-midpoint, and
   the sensing system re-performs the triangle midpoint extracting algorithm with respect to the extracted midpoint coordinate value, the first-triangle-midpoint coordinate value and the next coordinate value to extract a second coordinate value of the second-triangle-midpoint.

6. A method of driving a liquid crystal display device comprising a liquid crystal panel comprising a plurality of pixel regions defining a plurality of gate lines and a plurality of data lines, the plurality of pixel regions having first pixel cells and second pixel cells, each of the first pixel cells having only a pixel circuit for displaying data signal and each of the second pixel cells having both of the pixel circuit and a touch sensor circuit, wherein the first pixel cells are aligned in a matrix type corresponding to a full resolution, and the second pixel cells are aligned in a matrix type to have a resolution that is lower than the full resolution in a predetermined ratio, the method comprising steps of:
   displaying images by driving the first and second pixel cells provided in the liquid crystal panel and converting and outputting touch sensing signals transmitted from the second pixel cells into digital signals;

generating at least one compensation coordinate by calculating touch coordinates of the touch sensing signals detected therein by receiving the touch sensing signals, wherein the touch sensing signals are a sensed line with sharp angles, and by performing a triangle midpoint algorithm according to the touch coordinates and a connection direction of the touch coordinates at least one time, and outputting notation data generated from combining the touch coordinates and the at least one compensation coordinate connected thereto, wherein the at least one compensation coordinate changes the sensed line formed by a user to a gentle curve; and driving the liquid crystal panel to display the notation data in the liquid crystal panel together with image data input from the outside, wherein the generating step of the at least one compensation coordinate comprises steps of calculating coordinate values of the second pixel cells having the transmitted touch sensing signals detected therein, extendedly converting the calculated coordinate values of the second pixel cells to correspond to a ratio of an alignment resolution of the touch sensor circuits to the full resolution of the liquid crystal panel, and extracting coordinate values of regions having a curve formed therein by comparing and analyzing at least three coordinate values connected adjacent to the extracted coordinate values of the second pixel cells.

7. The method of claim 6, wherein the driving step of the liquid crystal panel further comprises steps of:
driving data lines of the liquid crystal panel;
driving gate lines of the liquid crystal panel; and
driving scan lines connected to the second pixel cells.

8. The method of claim 7, wherein the generating step of the at least one compensation coordinate comprises steps of:
extracting an inversion coordinate value of a former coordinate value by inverting a former coordinate value with respect to a reference coordinate value of the at least three coordinate values connected to each other;
extracting a coordinate value of a first-triangle-midpoint by performing a first-triangle midpoint extracting algorithm with respect to the extracted inversion coordinate value, the reference coordinate value and the next coordinate value connected next to the reference coordinate value; and
applying the extracted first-triangle-midpoint as compensation coordinate.

9. The method of claim 8, wherein the generating step of the at least one compensation coordinate further comprises a step of:
extracting first and second coordinate values of a second-triangle midpoint by performing a second-triangle-midpoint extracting algorithm with respect to the extracted first-triangle-midpoint coordinate value, the reference coordinate value and the next coordinate value and applying the extracted first and second second-triangle-midpoints as compensation coordinates.

10. The method of claim 9, wherein the extracting step of the first and second coordinates of the second-triangle-midpoint comprises steps of:
extracting the reference coordinate value and a midpoint coordinate value of the next coordinate value;
extracting the first coordinate value of the second-triangle-midpoint by performing the second-triangle-midpoint extracting algorithm with respect to the reference coordinate value, the first-triangle-midpoint coordinate value and the extracted midpoint coordinate value; and
extracting the second coordinate value of the second-triangle-midpoint by re-performing the triangle midpoint extracting algorithm with respect to the extracted midpoint coordinate value, the first coordinate value of the first-triangle midpoint and the next coordinate value.

\* \* \* \* \*